(12) United States Patent
Hoshino

(10) Patent No.: US 6,490,022 B1
(45) Date of Patent: Dec. 3, 2002

(54) LCD DEVICE AND METHOD OF MANUFACTURE THEREOF

(75) Inventor: Koichi Hoshino, Omiya (JP)

(73) Assignee: Citizen Watch Co., Ltd., Nishitokyo (JP)

( * ) Notice: Subject to any disclaimer, the term of this patent is extended or adjusted under 35 U.S.C. 154(b) by 0 days.

(21) Appl. No.: 09/623,415

(22) PCT Filed: Jan. 7, 2000

(86) PCT No.: PCT/JP00/00049

§ 371 (c)(1),
(2), (4) Date: Sep. 5, 2000

(87) PCT Pub. No.: WO00/41032

PCT Pub. Date: Jul. 13, 1999

(30) Foreign Application Priority Data

Jan. 7, 1999 (JP) .................................................. 11-1563

(51) Int. Cl.[7] ............................................. G02F 1/1335
(52) U.S. Cl. ........................ 349/153; 349/154; 349/188
(58) Field of Search ................................ 349/187, 188, 349/189, 153, 154, 70

(56) References Cited

FOREIGN PATENT DOCUMENTS

| JP | 58-37527 | | 8/1983 | |
|----|----------|---|--------|---|
| JP | 2-64523 | | 3/1990 | |
| JP | 2-68525 | | 3/1990 | |
| JP | 402064523 | * | 3/1990 | ................ 349/153 |
| JP | 2-127613 | | 5/1990 | |
| JP | 402127613 | * | 5/1990 | ................ 349/153 |
| JP | 402130520 | * | 5/1990 | ................ 349/153 |
| JP | 403246522 | * | 11/1991 | ................ 349/153 |
| JP | 406123890 | * | 5/1994 | ................ 349/153 |
| JP | 406273779 | * | 9/1994 | ................ 349/153 |
| JP | 8-194198 | | 7/1996 | |
| JP | 11-44886 | | 2/1999 | |

* cited by examiner

Primary Examiner—James Dudek
(74) Attorney, Agent, or Firm—Armstrong, Westerman & Hattori, LLP

(57) ABSTRACT

A liquid crystal display device (20) comprises two transparent substrates (1, 2) which are joined to each other via a sealing member (3) so as to form a gap therebetween, and a liquid crystal layer (21) which is sealed in the gap and formed of a polymer dispersion liquid crystal or polymer network liquid crystal. There are provided barriers (16) in the vicinity of both ends of a side (3a) of each seal (3) between the transparent substrates (1, 2) where the pouring port (5) is provided, for preventing the liquid crystal material from turning around into terminal areas (14) when the liquid crystal material is poured from the poring hole (5) into the gap (4), wherein an adhesive force between the barriers (16) and at least one of the transparent substrates (1, 2) is weaker than that between the seal (3) and the transparent substrate. As a result, the terminal areas (14) are prevented from being insulated from and covered with the liquid crystal material and the transparent substrates (1, 2) are prevented from being broken when they are cut, thereby improving a fabricating yield.

16 Claims, 3 Drawing Sheets

LCD DEVICE AND METHOD OF MANUFACTURE THEREOF

TECHNICAL FIELD

This invention relates to a liquid crystal display device which uses a polymer dispersion type liquid crystal or polymer network liquid crystal as a liquid crystal layer, which does not require a polarizing film, and a method of fabricating the same.

BACKGROUND TECHNOLOGY

There has been an increasing development of various types of liquid crystal display devices (display panels) which are rendered thin and light with low power consumption. There has been recently a growing demand for a lighter and thinner display device a high demand for a low cost display device.

As a means for rendering the liquid crystal display device thin and light, it is conceived that a substrate to be used is made thin. Since a glass substrate is generally employed by a liquid crystal display device, it is a most efficient means to render the liquid crystal display device thin and light by rendering the glass substrate thin.

There has been an increasing development of reflection-type liquid crystal display devices to obtain an excellent display quality even in outdoors in fine weather. Since the reflection-type liquid crystal display device can effect a display utilizing an external light without using a backlight consuming much power, it has been fairly developed so as to realize a liquid crystal display device having less power consumption.

Reflection-type liquid crystal display devices are roughly divided into two types, a first type is a device utilizing a polarizing film and a second type is a device not using a polarizing film.

A main type of the second reflection-type liquid crystal display device not using the polarizing film comprises two types, namely, one type using a liquid crystal layer composed of a guest-host liquid crystal including a dye contained in a liquid crystal, and another type using a liquid crystal layer composed of a polymer dispersion type liquid crystal having liquid crystal dispersed in a polymer or a polymer network type liquid crystal having liquid crystal which is present in gaps between net-like polymers.

Since these two types of reflection-type liquid crystal display devices effect display while the liquid crystal layer per se is varied in a transparent state and an opaque state depending on the presence or absence of a voltage applied to the liquid crystal layer, a polarizing film is not needed, thereby effecting a bright display.

As far as low cost is concerned, an honest and steady endeavor such as the reduction of cost of a material, saving of a material to be used, or the like is carried out.

There is a liquid crystal material as a typical wasteful material to be used, and various proposals are made for saving the liquid crystal material. As an example, there is proposed a liquid crystal display device as disclosed in JP 58-37527, B.

The outline of this liquid crystal display device is explained with reference to FIG. 5. The liquid crystal display device is fabricated integrally in a configuration where a plurality of liquid crystal display devices are arranged in a row as shown in FIG. 5. Respective liquid crystal display devices 10 comprise two transparent glass substrates 1, 2 (they seem only one glass substrate because they are overlapped with each other), and these glass substrates 1, 2 are bonded to each other to form given gaps 4 by seals 3 provided on portions of respective liquid crystal display devices 10.

Pouring ports 5 are provided on each side 3a (lower side in FIG. 5) common to the seals 3 at the center thereof for pouring liquid crystal material into the gaps 4 between two glass substrates 1, 2. Barriers 6 formed of the same sealing member are provided on both ends of the respective sides 3a so as to join the seals 3 of adjoining liquid crystal display devices 10.

The barriers 6 serve to prevent the liquid crystal material from entering between the seals 3 of the adjoining liquid crystal display devices 10 when pouring the liquid crystal material into the gaps 4 of a plurality of liquid crystal display devices 10 which are integrally formed with one another.

Accordingly, since the liquid crystal material proceeds forward inside the gaps 4 surrounded by the seals 3 of the respective liquid crystal display devices 10 and the front surface of the respective sides 3a in which each pouring port 5 is provided, the liquid crystal material scarcely enters unwanted areas, thereby saving the liquid crystal material to the maximum.

Further, if only the configuration of the seals 3 is devised, the barriers 6 can be formed at the same time when the seals 3 are formed so that the liquid crystal material can be saved without adding an extra process when fabricating the liquid crystal display device, thereby greatly contributing to the low cost of the liquid crystal display device.

After pouring the liquid crystal material into the gaps 4 of the respective liquid crystal display devices 10, the pouring ports 5 of the seals 3 are sealed by a sealing agent, not shown, thereby forming liquid crystal layers which are sealed between two glass substrates 1, 2 of the respective liquid crystal display devices 10.

Finally, two glass substrates 1, 2 are cut along positions depicted by prescribed cut lines 18, thereby separating the liquid crystal display devices 10 from each other so as to complete individual liquid crystal display devices 10.

Since the reflection-type liquid crystal display device not using a polarizing film can effect a bright display, it has been fairly developed, and it mainly comprises a type using a guest-host liquid crystal as a liquid crystal layer and another type using a polymer dispersion type liquid crystal or a polymer network type liquid crystal as the liquid crystal layer.

For example, when a display device using a polymer dispersion type liquid crystal or a polymer network type liquid crystal is fabricated, as explained with reference to FIG. 5, a liquid crystal material formed of a mixture composed of a monomer and the liquid crystal material is poured into the gaps 4 formed by the seals 3 between two glass substrates 1, 2 and the gaps are sealed, then the entire surface of the display device is irradiated with ultraviolet rays to polymerize the monomer in the liquid crystal material, thereby forming a liquid crystal layer formed of a polymer dispersion type liquid crystal or a polymer network type liquid crystal.

Meanwhile, typical liquid crystal display devices have terminal areas 14 having terminals provided on an internal surface of at least one of two glass substrates 1, 2 outside the seals 3 for electrically connecting electrodes (not shown) formed on the confronted inner surfaces of two glass substrates 1, 2 to an external circuit, as shown in FIG. 6.

When the liquid crystal display devices 10 are separated from one another by cutting two glass substrates 1, 2, the two glass substrates 1, 2 need to be separated at different positions so as to expose the terminal areas 14.

That is, the first substrate 1 positioned at the upper side in FIG. 6 is cut along first prescribed cut lines 7, and the second substrate 2 positioned at the lower side in FIG. 6 is cut along second prescribed cut lines 8, 8 every two positions so that the second substrate 2 confronting the terminal areas 14 of the first substrate 1 is removed when the liquid crystal display devices 10 are separated from each other, thereby exposing the terminal areas 14.

However, since the barriers 6 are formed of the same material as the seals 3, the terminal areas 14 formed on an inner surface of the first substrate 1 and the inner surface of the second substrate 2 confronting the terminal areas 14 are bonded to each other by the barriers 6 formed of a sealing member, so that the barriers 6 need to be peeled off by a force exceeding a force for adhering or bonding the glass substrates 1, 2 when the glass substrates 1, 2 are cut.

Since the sealing member has a strong adhesive force inherently, the terminal areas 14 of the first substrate 1 or a portion confronting the second substrate 2 is frequently broken before the unwanted portions of the second substrate 2 are removed by cutting.

The liquid crystal display devices 10 having the broken terminal areas 14 are of course faulty goods, and in the case of the liquid crystal display devices 10 having broken portions confronting the terminal areas 14, the broken portion remains on the terminal areas 14, and hence the liquid crystal display devices 10 are also faulty goods.

If the thickness of each substrate is rendered thin for rendering the liquid crystal display device 10 thin and light, this tendency becomes conspicuous. If glass having a thickness of about 0.5 mm is employed by each substrate, it is found that all the liquid crystal display devices 10 substantially become faulty goods by the same reason.

There are the following problems in the liquid crystal display device using the polymer dispersion type liquid crystal or polymer network type liquid crystal.

That is, if the barriers 6 shown in FIG. 6 are not provided, when a liquid crystal material formed of a mixture composed of a liquid crystal and a monomer is poured into the gaps of the respective liquid crystal display devices 10, the liquid crystal material enters the gaps between the seals 3 owing to capillary phenomenon to be also stuck to the terminal areas 14. Thereafter, if the liquid crystal material is irradiated with ultraviolet rays as it is, the monomer in the liquid crystal material on the terminal areas 14 is reacted to be polymerized.

Accordingly, even after the liquid crystal display devices are separated into individual ones, the polymerized liquid crystal material remains stuck to the surfaces of the terminal areas 14.

Since the polymerized liquid crystal material has a high insulating property, electric connection to the external circuit on the terminal areas 14 becomes difficult. Accordingly, it was necessary to have a special device not to render the liquid crystal material stuck to the terminal areas 14 not to be irradiated with ultraviolet rays or to provide a special process to completely remove the polymerized liquid crystal material, which was however difficult to carry out.

The invention has been developed to solve the foregoing problems, and it is an object of the invention to provide a liquid crystal display device capable of preventing a liquid crystal material from entering unwanted portions to save the amount of use of a liquid crystal material, and preventing a liquid crystal material particularly formed of polymer dispersion type liquid crystal or polymer network type liquid crystal from sticking to terminal areas of substrates, and preventing the substrates from being broken when the substrates are cut to separate the liquid crystal display devices into individual ones, so that a fabricating yield is improved to a greater extent.

DISCLOSURE OF THE INVENTION

To achieve the above object, the invention provides a liquid crystal display device having the following construction and a method of fabricating the same.

The liquid crystal display device according to the invention comprises two transparent substrates, a seal for forming a gap between the two substrates by joining the two substrates, a liquid crystal layer formed of a polymer dispersion type liquid crystal or a polymer network type liquid crystal sealed in the gap and a pouring port provided in the seal for pouring a liquid crystal material to form the liquid crystal layer.

The liquid crystal display device is characterized in further comprising barriers provided in the vicinity of both ends of one side of the seal between the substrates where the pouring port is provided for preventing the liquid crystal material from turning around the pouring port when the liquid crystal material is poured from the pouring port into the gap between the two substrates, wherein an adhesive force between the barriers and at least one of the substrates is weaker than that between the seal and the substrate.

Further, in the case of the liquid crystal display device having terminal areas provided on an inner surface of at least one of the two substrates outside the seal and having terminals thereon for electrically connecting electrodes formed on the transparent substrate to an external circuit, the foregoing barriers are provided for preventing the liquid crystal material from turning around into the terminal areas when the liquid crystal material is poured from the pouring port into the gap between the two substrates.

The respective barriers may be formed of a conductive paste or the like having an adhesive force which is weaker than that of the seal.

Alternatively, the liquid crystal display device further includes an intermediate layer formed of a transparent organic material provided between the barriers and at least one of the two substrates, thereby weakening the adhesive force between the barriers and the substrate.

The liquid crystal display device according to the invention has the barriers for preventing the liquid crystal material from turning around to an outer periphery of the seal when pouring the liquid crystal material into the gap formed by the seal between the two substrates, thereby reducing a wasteful liquid crystal material to a greater extent. Further, a liquid crystal material is prevented from sticking to terminal areas of the substrate to form an insulating film when it is irradiated with ultraviolet rays, thereby preventing electric connection to an external circuit from being difficult.

Further, the barriers of the invention are different from the conventional barriers, namely, an adhesive force between the barriers and the substrate is weaker than an adhesive force between the seal and the substrate. Accordingly, when the liquid crystal display devices are separated from one another into individual ones after a plurality of liquid crystal display devices are formed on the same substrates, it is possible to prevent the fabrication of inferior or faulty liquid crystal display devices owing to the breakage of substrates, thereby improving a fabricating yield to a greater extent.

The method of fabricating a liquid crystal display device of the invention has the following steps.

(1) A step of forming a seal for sealing a liquid crystal layer on an inner surface of one of two transparent substrates having respectively electrodes on confronted inner surfaces thereof while leaving a pouring port for pouring a liquid crystal material;

(2) A step of forming connecting means provided outside the seal for electrically connecting the electrodes formed on the two substrates, and barriers for preventing the liquid crystal material from turning around into a portion where the connecting means are provided when the liquid crystal material is poured from the pouring port of the seal, respectively on an inner surface of one or the other of the two substrates wherein the connecting means and the barriers are respectively formed of a conductive material having an adhesive force weaker than that of the seal;

(3) A step of forming a gap between the two substrates by joining the two substrates via the seal;

(4) A step of pouring the liquid crystal material formed of a mixture composed of a liquid crystal and a monomer from the pouring port provided in the seal into the gap, then sealing the pouring port; and (5) A step of forming the liquid crystal layer formed of a polymer dispersion type liquid crystal or polymer network type liquid crystal by irradiating the liquid crystal material with ultraviolet rays to polymerize the monomer.

The foregoing connecting means and barriers can be formed by printing using a conductive paste such as a silver paste or a carbon paste The method of fabricating the liquid crystal display device of the invention may have the following steps of A to F.

A. a step of forming seals for respective liquid crystal display devices to seal liquid crystal layers on an inner surface of one of two transparent substrates while leaving pouring ports for pouring a liquid crystal material so as to fabricate a plurality of liquid crystal display devices at the same time, B. a step of forming barriers in the vicinity of both ends of a side of each seal on an inner surface of one or the other of the two substrates where the pouring ports are provided for preventing the liquid crystal material from turning around to portions between the adjoining liquid crystal display devices when the liquid crystal material is poured from the pouring ports, wherein the barriers are formed of a material having an adhesive force weaker than that of the seals in the manner that the barriers between adjoining liquid crystal display devices are continuous with one another, C. a step of forming gaps for use in respective liquid crystal display devices between the two substrates by joining the two substrates via the seals;

D. a step of pouring the liquid crystal material formed of a mixture composed of a liquid crystal and a monomer from the pouring ports provided in the seals into the gaps for respective liquid crystal display devices, then sealing the pouring ports;

E. a step of forming the liquid crystal layers made of a polymer dispersion type liquid crystal or polymer network type liquid crystal by irradiating the liquid crystal material sealed in the gaps with ultraviolet rays to polymerize the monomer; and F. a step of cutting the two substrates along portions where the barriers are formed to separate the liquid crystal display devices from one another.

The connecting means and the barriers may be formed on an inner surface of one of or the other of the two substrates via intermediate layers respectively formed of a transparent organic material by changing the foregoing step of B.

Further, in the case of fabricating a liquid crystal display device provided with terminal areas on an inner surface of at least one of the substrates outside the seals, wherein the terminal areas have terminals for electrically connecting the electrodes provided on the substrates to an external device, the foregoing step of B may be changed to the following.

That is, there are formed the barriers for preventing the liquid crystal material from turning around into terminal areas respectively on an inner surface of one or the other of the two substrates when the liquid crystal material is poured from the pouring ports of the respective seals, wherein the barriers are formed of a material having an adhesive force weaker than that of the seals or they are formed via intermediate layers made of a transparent organic material in the manner that the barriers between adjoining liquid crystal display devices are continuous with one another, on an inner surface of one or the other of the two substrates.

In the foregoing step of B or in a step where the foregoing step of B is partially modified, the barriers may be formed by printing using a conductive paste such as a silver paste or a carbon paste. Further, when the barriers are formed via the intermediate layer formed of a transparent organic material, the barriers per se may be formed of the same material as the seals.

BEST MODE FOR CARRYING OUT THE INVENTION

A liquid crystal display device and a method of fabricating the same according to the best mode of embodiment of the invention are now described with reference to the attached drawings.

Figure 1:
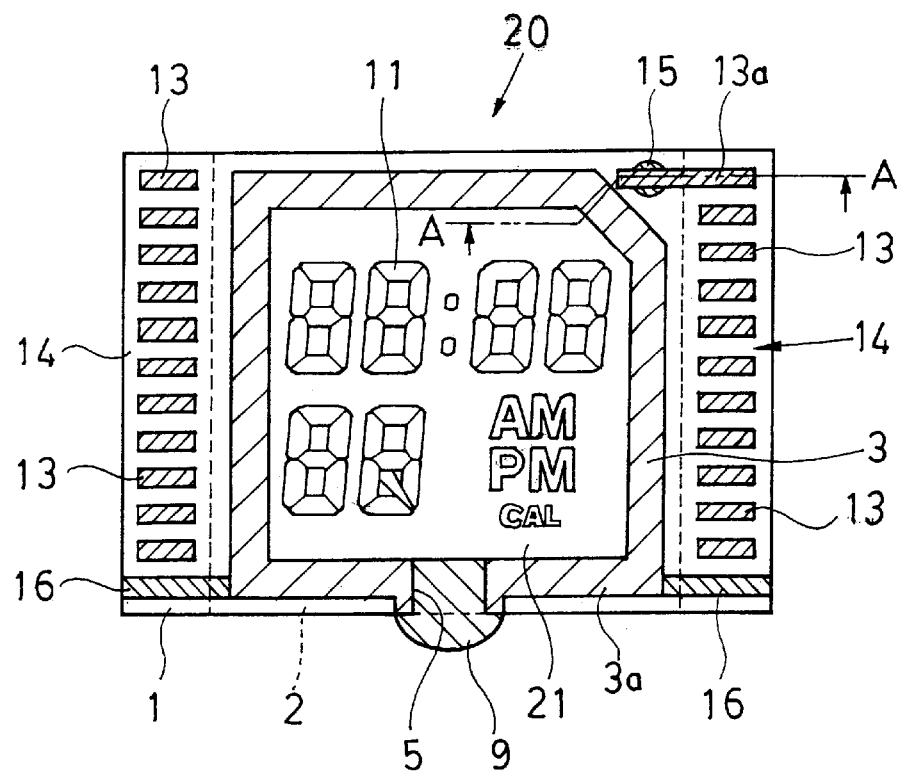
FIG. 1 is a plan view of a liquid crystal display device according to an embodiment of the invention.
Figure 2:
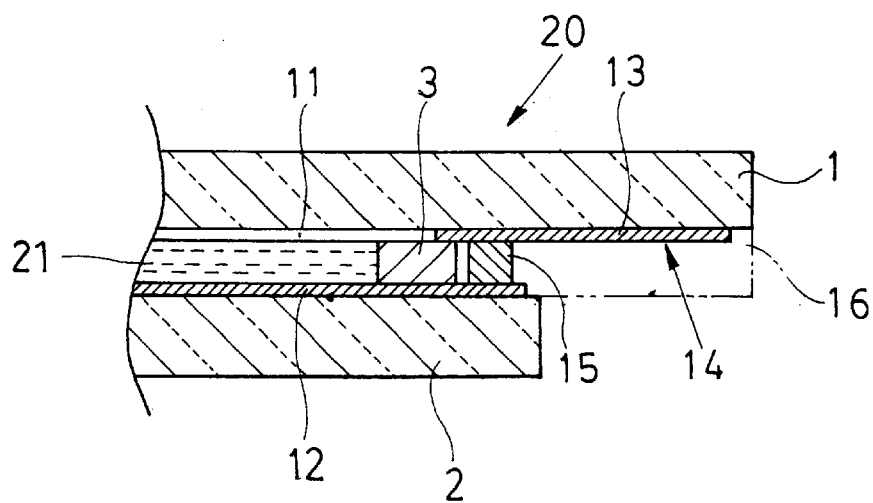
FIG. 2 is a partially enlarged sectional view taken along the line A—A in FIG. 1.

Liquid Crystal Display Device: FIG. 1 and FIG. 2

Figure 5:
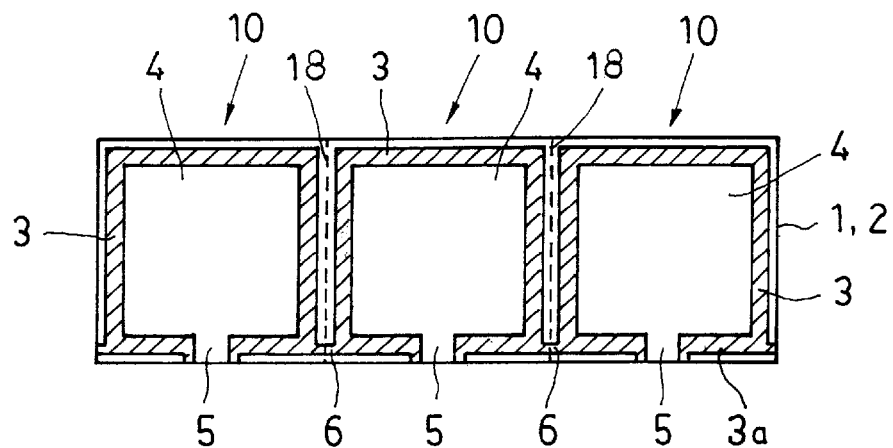
FIG. 5 is a plan view of conventional liquid crystal display devices for explaining a method of fabricating the conventional liquid crystal display devices and showing a state in the middle of fabricating steps.
Figure 6:
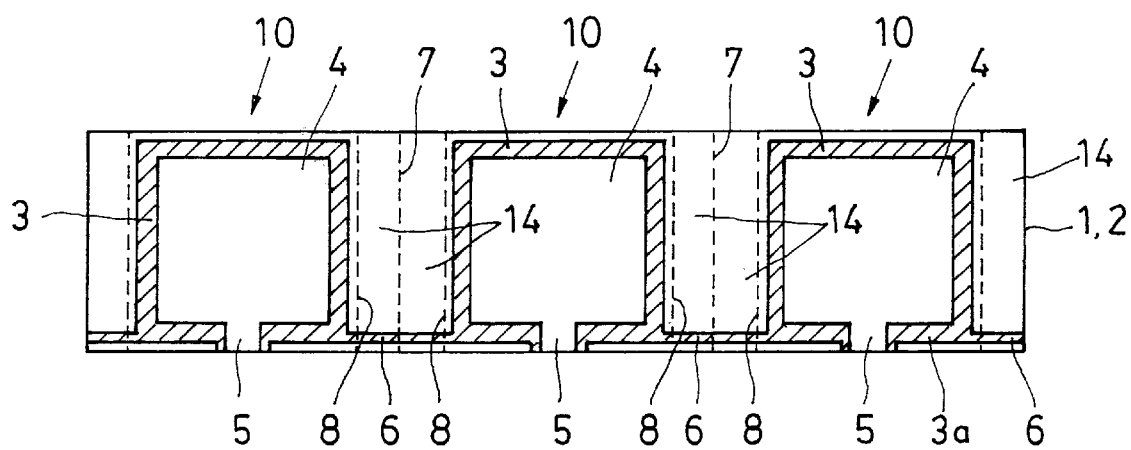
FIG. 6 is a plan view of another conventional liquid crystal display devices.

FIG. 1 is a plan view of a liquid crystal display device according to an embodiment of the invention, and FIG. 2 is a partially enlarged sectional view taken along the line A—A in FIG. 1. In FIGS. 1 and 2, components corresponding to the conventional liquid crystal display device shown in FIGS. 5 and 6 are depicted by the same reference numerals.

A liquid crystal display device 20 comprises, as shown in FIGS. 1 and 2, two transparent substrates, namely, a first substrate 1 and a second substrate 2, a seal 3 forming a gap between the first and second substrates 1, 2 by joining (bonding) these first and second substrates 1, 2, and a liquid crystal layer 21 formed of a polymer dispersion type liquid crystal or polymer network type liquid crystal that is sealed in the gap.

Since the first and second substrates 1, 2 are transparent, the seal 3 and so forth provided on the backside of the first substrate 1 from the view's side in FIG. 1 can be seen, and hence they are represented by the solid line.

A pouring port 5 is provided in the seal 3 for pouring a liquid crystal material forming the liquid crystal layer 21, and the pouring port 5 is sealed by a sealant 9 after the liquid crystal material is poured into the pouring port 5.

Barriers 16 are provided on both ends of each side 3a in which the pouring port 5 of the seal 3 between the first and second substrates 1, 2 is provided, along the outer configuration of the first and second substrates 1, 2 for preventing the liquid crystal material from turning around the outer periphery of the seal 3 when the liquid crystal material is poured from the pouring port 5 into the gap between the first and second substrates 1, 2. An adhesive force between the barriers 16 and at least one of the first and second substrates 1, 2 (second substrate 2 in this embodiment) is weaker than that between the seal 3 and the second substrate 2.

Both the first and second substrates 1, 2 employ a grass plate having a thickness of 0.3 nm to meet the demand of a thin and light liquid crystal display device. The seal 3 is formed by subjecting a seal material in which a glass fiber is mixed, serving as a spacer material for limiting the thickness of the liquid crystal layer 21, to a screen printing on the second substrate 2.

The barriers 6 are formed by subjecting a carbon paste or a silver paste, which is weaker than the seal material in adhesive force, to a screen printing on the first substrate 1.

As a liquid crystal material for forming the liquid crystal layer 21 uses a mixture of liquid crystal and a monomer. The liquid crystal material is poured from the pouring port 5 provided on the seal 3 into the gap, then the entire surface of the liquid crystal display device 20 is irradiated with ultraviolet rays, causing the monomer in the liquid crystal material to polymerize, thereby forming the liquid crystal layer 21 composed of a polymer dispersion type liquid crystal or polymer network type liquid crystal.

Further, a first electrode 11 and a second electrode 12 formed of a transparent conductive film such as indium tin oxide (ITO) are formed on the confronted inner surfaces of the first substrate 1 and the second substrate 2.

According to this embodiment, the first electrodes 11 formed on the inner surface of the first substrate 1 comprise a multitude of segment electrodes for displaying numerals and alphabets and wiring electrodes thereof as shown in FIG. 1 while the second electrodes 12 formed on the inner surface of the second substrate 2 are common electrodes confronting all the segment electrodes.

Terminal areas 14 are provided on at least one of the first and second substrates 1, 2, namely, on the inner surface of the first substrate 1 outside (right and left sides in FIG. 1) the seal 3 in this embodiment for forming a multitude of terminals 13 to electrically connect the first electrodes 11 formed on the first substrate 1 to an external circuit, and a plurality of terminals 13a to electrically connect the second electrodes 12 formed on the second substrate 2 to the external circuit.

Segment electrodes respectively constituting the first electrode 11 are individually connected to the terminals 13 of the terminal areas 14 through wiring electrodes, not shown, extending to the terminal areas 14 via the seal 3. The wiring electrodes of the second electrodes 12 also pass through between the seal 3 and the second substrate 2, and extend to positions confronting the terminals 13a of the terminal areas 14. A connecting member (connecting means) 15 formed of a conductive material is provided between the wiring electrode of the second electrode 12 and the terminal 13a so as to electrically connect the second electrode 12 and the terminal 13a.

In this embodiment, both the connecting member 15 and barriers 16 are formed on the first substrate 1 at the same time by screen printing using a carbon paste or silver paste.

In this case, when the liquid crystal material is poured from the pouring port 5 into the gap between the first and second substrates 1, 2, the barriers 16 serve to prevent the liquid crystal material from turning around into the portion where the terminal areas 14 of the first substrate 1 and the connecting member 15 of the first and second substrates 1, 2 are provided.

Both the connecting members 15 and the barriers 16 can be formed of different materials, and in that case at least the connecting member 15 is required to be formed of a conductive material while the barriers 16 may be formed of an insulating material. Even if the barriers 16 are not formed of a material which is weaker than the seal 3 in adhesive force, an adhesive force between the barriers 16 and the second substrate 2 may be weakened or reduced by providing an intermediate layer formed of a transparent organic material having a weak adhesive force at least between the barriers 16 and the second substrate 2. In such a case, the barriers 16 can be formed of a sealing member at the same time when the seal 3 is formed.

A Method of Fabricating a Liquid Crystal Display Device: FIG. 1 to FIG. 4

A method of fabricating a liquid crystal display device according to the invention is now described with reference to FIG. 1 to FIG. 4.

Figure 3:
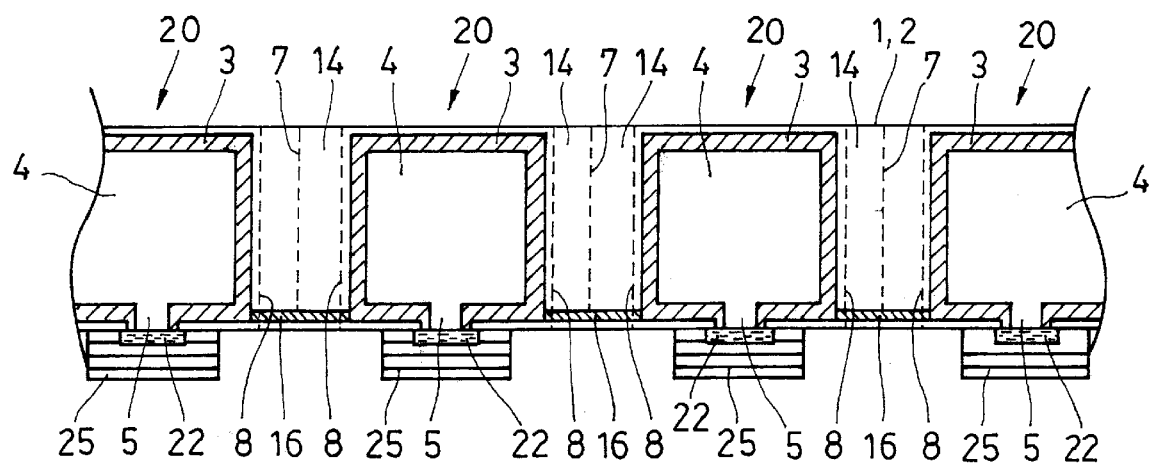
FIG. 3 is a plan view of liquid crystal display devices of the invention for explaining a method of fabricating the liquid crystal display devices and showing a state in the middle of fabricating steps.
Figure 4:
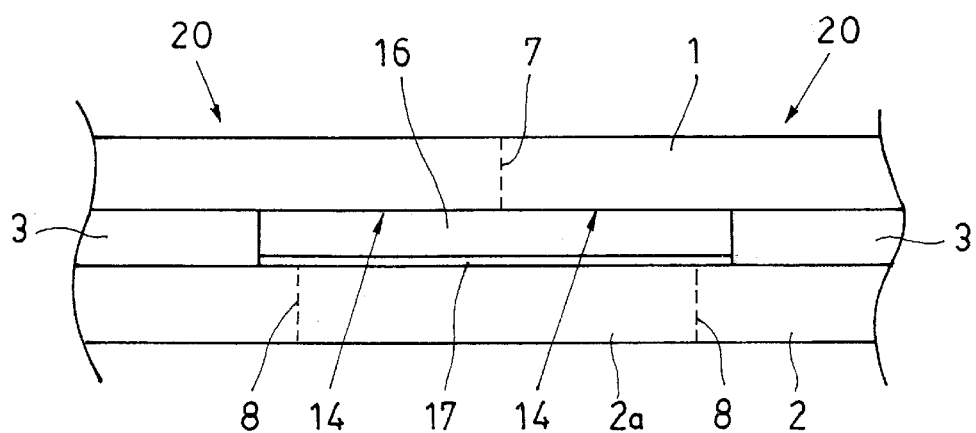
FIG. 4 is an enlarged front view of a portion where two liquid crystal display devices adjoin each other in FIG. 3.

FIG. 3 is a plan view of liquid crystal display devices of the invention for explaining a method of fabricating a plurality of liquid crystal display devices using the same substrates at the same time and showing a state in the middle of fabricating steps, and FIG. 4 is an enlarged front view of a portion where two liquid crystal display devices adjoin each other. In these figures, components corresponding to those shown in FIGS. 1 and 2 are depicted by the same reference numerals and explanation thereof is omitted or simplified.

According to this embodiment, transparent first and second substrates 1, 2 respectively comprising electrodes formed on the confronted inner surfaces are prepared, and seals 3 for sealing liquid crystal layers 21 of liquid crystal display devices 20 are formed on the inner surface of one of the first and second substrates, for example, on the inner surface of the second substrate 2 while pouring ports 5 through which a liquid crystal material is poured remains in the seals 3. The seals 3 are formed of a sealing member having a strong adhesive force. At this time, the pouring ports 5 are arranged along each one side of the first and second substrates 1, 2 positioned at the lower side in FIG. 3.

Subsequently, connecting members (connecting means) 15 provided outside the seals 3 formed on an inner surface of one or the other of the two substrates 1, 2, on an inner surface of the first substrate 1 in this embodiment, for electrically connecting second electrodes 12 formed on the second substrate 2 to terminals (electrodes) 13a formed on the first substrate 1 shown in FIGS. 1 and 2 and barriers for preventing a liquid crystal material from turning around into the portion where connecting members 15 of the respective liquid crystal display devices are provided and the respective terminal areas 14 when a liquid crystal material is poured from the pouring ports 5 of the seals 3 shown in FIG. 3 are respectively formed of a conductive material having an adhesive force which is weaker than that of the seals 3.

Both the connecting members 15 and barriers 16 are formed on the first substrate 1 at the same time by a screen printing using a carbon paste or a silver paste serving as a conductive paste. The screen printing is applied in the manner that the respective barriers 16 of the adjoining liquid crystal display device 20 are continuous with one another.

Then, the first substrate 1 and the second substrate 2 are laid on each other so as to be aligned with each other and heat is applied to the first and second substrates 1, 2 while pressure is applied thereto so as to cure the seals 3 formed of the sealing member, and the barriers 16 and the connecting members 15 respectively formed of a carbon paste or silver paste.

As a result, both the first and second substrates 1, 2 are joined (bonded) to each other via the seals 3 to form gaps 4 between the first and second substrates 1, 2.

Thereafter, a space between the first and second substrates 1, 2 is rendered in vacuum, and liquid crystal plates 25 in which liquid crystal materials 22 formed of a mixture of a liquid crystal and a monomer is introduced are connected to the respective pouring ports 5 provided in the seals 3 of the liquid crystal display devices 20, then the liquid crystal materials 22 are poured into the gaps 4 and the pouring ports 5 are sealed by a sealant 9 shown in FIG. 1.

Entire surfaces of the first and second substrates 1, 2 are irradiated with ultraviolet rays so that the liquid crystal materials 22 inside the gaps 4 are irradiated with ultraviolet rays to polymerize the monomer, thereby forming the liquid crystal layers 21 formed of a polymer dispersion type liquid crystal or polymer network type liquid crystal (see FIG. 2).

Finally, the first and second substrates 1, 2 are cut along the portions where the barriers 16 are formed to separate the liquid crystal display device 20 from one another into individual ones. That is, the first substrate 1 is cut along first prescribed cut lines 7 and the second substrate 2 is cut along the second prescribed cut lines 8, 8 so as to separate the respective liquid crystal display devices 20 from one another into individual ones so that the liquid crystal display device 20 of the invention is completely fabricated.

At this time, when the second substrate 2 is cut along two second prescribed cut lines 8, 8 between the adjoining liquid crystal display devices 20, the portions therebetween, namely, the portions confronting the terminal areas 14 of the first substrate 1 are removed so that the terminal areas 14 are exposed. At this time, since an adhesive force between the second substrate 2 and the barriers 16 is weaker than that between the second substrate 2 and seals 3, the adhesion between the removal portions of the second substrate 2 and the barriers 16 is easily released so that neither second substrate 2 nor first substrate 1 is broken.

Although this embodiment explained the case where the connecting members 15 and the barriers 16 are formed by the same conductive material at the same time, the connecting members 15 and the barriers 16 may be formed separately or they may be formed in the following manner. Namely, in the case of the liquid crystal display device having no connecting members 15 as shown in FIGS. 1 and 2, the barriers 16 may be formed of an insulating material or the barriers 16 may be formed while intervening a intermediate layer 17 made of a transparent organic material between themselves and the inner surface of the second substrate 2 as shown in FIG. 4 instead of the barriers 16 formed of a material having a weak adhesive force. The transparent organic material may be formed of a material which is the same as e.g., an insulating film formed on a color filter in a color liquid crystal display device.

In the foregoing manner, an adhesive force between the barriers 16 and the second substrate 2 is much weaker than that between the seals 3 and the second substrate 2. Accordingly, in the final fabricating process, when the liquid crystal display devices 20 are separated from one another into individual ones by cutting the first substrate 1 along the first prescribed cut lines 7 depicted by broken lines shown in FIG. 4, and cutting the second substrate 2 along the second prescribed cut lines 8, 8, adhesion between portions 2a within the second prescribed cut lines 8, 8 of the second substrate 2 and the barriers 16 is easily released, thereby removing first and second substrates 1, 2 without destroying them.

According to this embodiment of the invention, since the barriers 16 having a weak adhesive force are provided in the vicinity of both ends of the one side 3a of the seals 3 where the pouring ports 5 are provided, when the liquid crystal materials 22 for forming the liquid crystal layers are poured into the gaps in the liquid crystal display devices 20, the barriers 16 block the gaps between the first and second substrates 1, 2 of the seals 3. As a result, it is possible to prevent the liquid crystal materials 22 from entering the gaps in the adjoining liquid crystal display devices 20, particularly the terminal areas 14 owing to a capillary phenomenon.

Accordingly, since the liquid crystal materials 22 are not stuck to the terminal areas 14 when the entire surfaces of the first and second substrates 1, 2 are irradiated with ultraviolet rays, it is not necessary to have a special device outside the seals 3 for preventing the irradiation with ultraviolet rays or to provide a special process to completely remove the cured liquid crystal material.

Further, since the adhesive force between the second substrate 2 and the barriers 16 is weaker than that between the seals 3 and the second substrate 2, the unwanted portions of the substrate can be easily separated and removed from the barriers 16 when the liquid crystal display devices 20 are separated from one another into individual ones by cutting the first and second substrates 1, 2 respectively formed of a thin glass, so that the liquid crystal display devices 20 are prevented from being faulty by the breakage of first and second substrates 1, 2.

Further, according to this embodiment, since the connecting members 15 for electrically connecting the second electrodes 12 on the second substrate 2 and the terminals (electrodes) 13 on the first substrate 1, and the barriers 16 can be formed of the same conductive paste by a screen printing at the same time, thereby enabling to form the barriers 16 without increasing any step.

Further, although a carbon paste made by Nippon Graphite Industries Ltd. (Product name is EVERIOHM) is employed as the conductive material, it is not limited thereto but may be formed of any material capable of having a sufficient conductivity and preventing the advance of the liquid crystal, and having an adhesive force which is weaker than that of a sealing member. For example, a silver paste can be employed, and if the carbon paste may be substituted by a gold paste or platinum paste although it is expensive, conductivity is further enhanced.

Further, although both the barriers 16 and the connecting members 15 are formed by a screen printing at the same time, they may be formed by individual processes, although the number of processes increase.

If the barriers 16 and the connecting members 15 are formed by individual processes, the barriers 16 may be formed of any material provided that the material is weaker than a sealing member in adhesive force and capable of preventing the advance of the liquid crystal, and a method of fabricating the barriers 16 is not limited to a screen printing. Further, the barriers 16 may be formed while a transparent organic material is intervened between the barriers 16 and the substrate.

INDUSTRIAL APPLICABILITY

As mentioned above, if the liquid crystal display device or the method of fabricating the same according to the invention is carried out, it is possible to prevent a liquid crystal material from entering unwanted portions when fabricating the liquid crystal display device so as to save the amount of use of the liquid crystal material, and capable of preventing a liquid crystal material formed of a polymer dispersion type liquid crystal or polymer network type liquid crystal from sticking to terminal areas so as to prevent electrodes on the substrates from not electrically connecting to an external circuit. Further, when the liquid crystal display devices are separated from one another into individual ones by cutting the substrates, the substrates are prevented from being broken, thereby improving a fabricating yield of the liquid crystal display device to a greater extent.

What is claimed is:

1. A liquid crystal display device comprising:
   two transparent substrates;
   a seal for forming a gap between the two substrates by joining the two substrates,
   a liquid crystal layer formed of a polymer dispersion type liquid crystal or a polymer network type liquid crystal sealed in the gap;
   a pouring port provided in the seal for pouring a liquid crystal material to form the liquid crystal layer; and
   barriers provided on an inner surface of the two substrates in the vicinity of both ends of one side of the seal between the substrates where the pouring port is provided for preventing the liquid crystal material from turning around the pouring port when the liquid crystal material is poured from the pouring port into the gap between the two substrates, wherein an adhesive force between the barriers and at least one of the substrates is weaker than that between the seal and the substrate.

2. A liquid crystal display device comprising:
   two transparent substrates having electrodes on confronted inner surfaces thereof;
   a seal for forming a gap between the two substrates by joining the two substrates;
   a liquid crystal layer formed of a polymer dispersion type liquid crystal or a polymer network type liquid crystal sealed in the gap;
   terminal areas provided outside the seal formed on an inner surface of at least one of the two substrates and having terminals thereon for electrically connecting electrodes formed on the substrate to an external circuit;
   a pouring port provided in the seal for pouring a liquid crystal material to form the liquid crystal layer; and
   barriers provided on an inner surface of the two substrates in the vicinity of both ends of one side of the seal between the substrates where the pouring port is provided for preventing the liquid crystal material from turning around into the terminal areas when the liquid crystal material is poured from the pouring port into the gap between the two substrates, wherein an adhesive force between the barriers and at least one of the substrates is weaker than that between the seal and the substrate.

3. The liquid crystal display device according to claim 1, wherein the barriers are formed of a material having an adhesive force which is weaker than that of the seal.

4. The liquid crystal display device according to claim 2, wherein the barriers are formed of a material having an adhesive force which is weaker than that of the seal.

5. The liquid crystal display device according to claim 1, wherein the barriers are formed of a conductive paste.

6. The liquid crystal display device according to claim 2, wherein the barriers are formed of a conductive paste.

7. The liquid crystal display device according to claim 1, further comprising an intermediate layer provided between the barriers and at least one of the two substrates and formed of a transparent organic material, thereby weakening an adhesive force between the barriers and the substrates.

8. The liquid crystal display device according to claim 2, further comprising an intermediate layer provided between the barriers and at least one of the two substrates and formed of a transparent organic material, thereby weakening an adhesive force between the barriers and the substrates.

9. A method of fabricating a liquid crystal display device comprising the steps of:
   forming a seal for sealing a liquid crystal layer on an inner surface of one of two transparent substrates respectively having electrodes on confronted inner surfaces thereof while leaving a pouring port for pouring a liquid crystal material;
   forming connecting means formed on an inner surface of one or the other of the two substrates for electrically connecting the electrodes formed on said two substrates outside the seal, and barriers for preventing the liquid crystal material from turning around into a portion where the connecting means are provided when the liquid crystal material is poured from the pouring port of the seal, wherein said connecting means and the barriers are respectively formed of a conductive material having an adhesive force weaker than that of the seal;
   forming a gap between the two substrates by joining the two substrates via the seal;
   pouring the liquid crystal material formed of a mixture composed of a liquid crystal and a monomer from the pouring port provided in the seal into the gap, then sealing the pouring port; and
   forming the liquid crystal layer formed of a polymer dispersion type liquid crystal or polymer network type liquid crystal by irradiating the liquid crystal material with ultraviolet rays to polymerize the monomer.

10. A method of fabricating a liquid crystal display device comprising the steps of:
    forming seals for respective liquid crystal display devices to seal liquid crystal layers on an inner surface of one of two transparent substrates while leaving pouring ports for pouring a liquid crystal material so as to fabricate a plurality of liquid crystal display devices at the same time;
    forming barriers in the vicinity of both ends of a side of the each seal on an inner surface of one or the other of the two substrates where the pouring ports are provided, for preventing the liquid crystal material from turning around into portions between the adjoining liquid crystal display devices when the liquid crystal material is poured from the pouring ports, wherein said barriers are formed of a material having an adhesive force weaker than that of the seals in the manner that the barriers between adjoining liquid crystal display devices are continuous with one another;

forming gaps for respective liquid crystal display devices between the two substrates by joining the two substrates via the seals;

pouring the liquid crystal material formed of a mixture composed of a liquid crystal and a monomer from the pouring ports provided in the seals into the gaps for respective liquid crystal display devices, then sealing the pouring ports;

forming the liquid crystal layers made of a polymer dispersion type liquid crystal or polymer network type liquid crystal by irradiating the liquid crystal material sealed in the gaps with ultraviolet rays to polymerize the monomer; and cutting the two substrates along portions where the barriers are formed to separate the liquid crystal display devices from one another.

11. A method of fabricating a liquid crystal display device comprising the steps of:

forming seals for respective liquid crystal display devices to seal liquid crystal layers on an inner surface of one of two transparent substrates while leaving pouring ports for pouring a liquid crystal material so as to fabricate a plurality of liquid crystal display devices at the same time;

forming barriers in the vicinity of both ends of a side of the each seal on an inner surface of one or the other of the two substrates where the pouring ports are provided, for preventing the liquid crystal material from turning around into portions between the adjoining liquid crystal display devices when the liquid crystal material is poured from the pouring ports, wherein said barriers are formed via intermediate layers made of a transparent organic material in the manner that the barriers between adjoining liquid crystal display devices are continuous with one another;

forming gaps for respective liquid crystal display devices between the two substrates by joining the two substrates via the seals;

pouring the liquid crystal material formed of a mixture composed of a liquid crystal and a monomer from the pouring ports provided in the seals into the gaps for respective liquid crystal display devices, then sealing the pouring ports;

forming the liquid crystal layers made of a polymer dispersion type liquid crystal or polymer network type liquid crystal by irradiating the liquid crystal material sealed in the gaps with ultraviolet rays to polymerize the monomer; and cutting the two substrates along portions where the barriers are formed to separate the liquid crystal display devices from one another.

12. A method of fabricating a liquid crystal display device comprising the steps of:

forming seals for respective liquid crystal display devices to seal liquid crystal layers on an inner surface of one of two transparent substrates respectively having electrodes for respective liquid crystal display devices on confronted inner surfaces thereof while leaving pouring ports for pouring a liquid crystal material so as to fabricate a plurality of liquid crystal display devices at the same time;

forming barriers for preventing the liquid crystal material from at least turning around into terminal areas where terminals for electrically connecting electrodes formed on the inner surfaces of the substrates to an external circuit are formed when the liquid crystal material is poured from the pouring ports of the seals, formed on an inner surface of one or the other of the two substrates, wherein said barriers are formed of a material having an adhesive force weaker than that of the seals in the manner that the barriers between adjoining liquid crystal display devices are continuous with one another;

forming gaps for respective liquid crystal display devices between the two substrates by joining the two substrates via the seals;

pouring the liquid crystal material formed of a mixture composed of a liquid crystal and a monomer from the pouring ports provided in the seals into the gaps for respective liquid crystal display devices, then sealing the pouring ports;

forming the liquid crystal layers made of a polymer dispersion type liquid crystal or polymer network type liquid crystal by irradiating the liquid crystal material sealed in the gaps with ultraviolet rays to polymerize the monomer; and cutting the two substrates along portions where the barriers are formed to separate the liquid crystal display devices from one another.

13. A method of fabricating a liquid crystal display device comprising the steps of:

forming seals for respective liquid crystal display devices to seal liquid crystal layers on an inner surface of one of two transparent substrates respectively having electrodes for respective liquid crystal display devices on confronted inner surfaces thereof while leaving pouring ports for pouring a liquid crystal material so as to fabricate a plurality of liquid crystal display devices at the same time;

forming barriers for preventing the liquid crystal material from at least turning around into terminal areas where terminals for electrically connecting electrodes formed on the inner surfaces of the substrates to an external circuit are formed when the liquid crystal material is poured from the pouring ports of the seals, formed on an inner surface of one or the other of the two substrates, wherein said barriers are formed via intermediate layers made of a transparent organic material in the manner that the barriers between adjoining liquid crystal display devices are continuous with one another;

forming gaps for respective liquid crystal display devices between the two substrates by joining the two substrates via the seals;

pouring the liquid crystal material formed of a mixture composed of a liquid crystal and a monomer from the pouring ports provided in the seals into the gaps for use in respective liquid crystal display devices, then sealing the pouring ports;

forming the liquid crystal layers made of a polymer dispersion type liquid crystal or polymer network type liquid crystal by irradiating the liquid crystal material sealed in the gaps with ultraviolet rays to polymerize the monomer; and cutting the two substrates along portions where the barriers are formed to separate the liquid crystal display devices from one another.

14. The method of fabricating a liquid crystal display device according to claim 9, wherein in the step of forming the connecting means and the barriers, the connecting means and the barriers are respectively formed by printing using a conductive paste.

15. The method of fabricating a liquid crystal display device according to claim 10, wherein in the step of forming the barriers, the barriers are formed by printing using a conductive paste.

16. The method of fabricating a liquid crystal display device according to claim 12, wherein in the step of forming the barriers, the barriers are formed by printing using a conductive paste.

* * * * *

UNITED STATES PATENT AND TRADEMARK OFFICE
CERTIFICATE OF CORRECTION

PATENT NO.    : 6,490,022 B1
DATED         : December 3, 2002
INVENTOR(S)   : Koichi Hoshino It is certified that error appears in the above-identified patent and that said Letters Patent is hereby corrected as shown below:

<u>Title page,</u>
Item [87], change "PCT Pub. Date: Jul. 13, 1999" to be -- PCT Pub. Date: Jul. 13, 2000 --

Signed and Sealed this

Twenty-ninth Day of July, 2003

JAMES E. ROGAN
*Director of the United States Patent and Trademark Office*